United States Patent [19]

Wynosky et al.

[11] 4,149,375

[45] Apr. 17, 1979

[54] LOBE MIXER FOR GAS TURBINE ENGINE

[75] Inventors: Thomas A. Wynosky, Madison, Conn.; Richard A. Streib; Charles A. Campbell, both of Palm Beach Gardens, Fla.

[73] Assignee: United Technologies Corporation, Hartford, Conn.

[21] Appl. No.: 745,946

[22] Filed: Nov. 29, 1976

[51] Int. Cl.² .............................................. F02K 1/26
[52] U.S. Cl. ..................................... 60/262; 60/271; 239/265.17; 181/220
[58] Field of Search ............................ 60/262, 271; 239/265.17; 181/33 HB, 33 HC

[56] References Cited

U.S. PATENT DOCUMENTS

| 2,914,916 | 12/1959 | Gelin et al. | 239/265.17 |
| 3,144,913 | 8/1964 | Bailey | 181/33 HB |
| 3,227,240 | 1/1966 | Lee et al. | 239/265.17 |
| 3,861,140 | 1/1975 | Krabacher | 60/262 |

OTHER PUBLICATIONS

"Noise Suppressors For Turbojet Engines," NASA TN4261, pp. 25, 26; Apr. 1958.

Primary Examiner—Robert E. Garrett
Attorney, Agent, or Firm—Norman Friedland

[57] ABSTRACT

The lobe-type mixer on a turbine type power plant is improved upon by "scalloping" the side walls for enhancing mixing of two flow streams to obtain improved noise suppression and/or engine performance. The improved lober mixer also minimizes pressure losses.

6 Claims, 2 Drawing Figures

FIG. 2
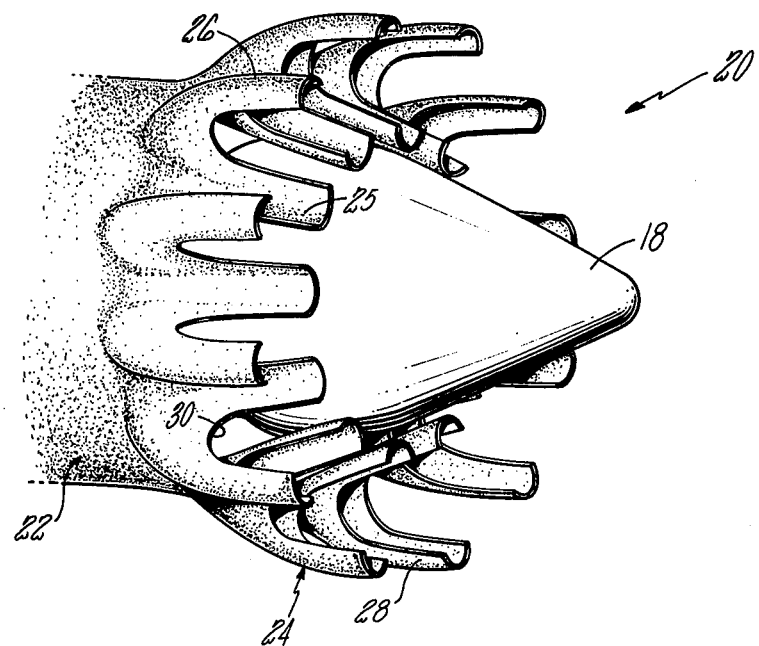
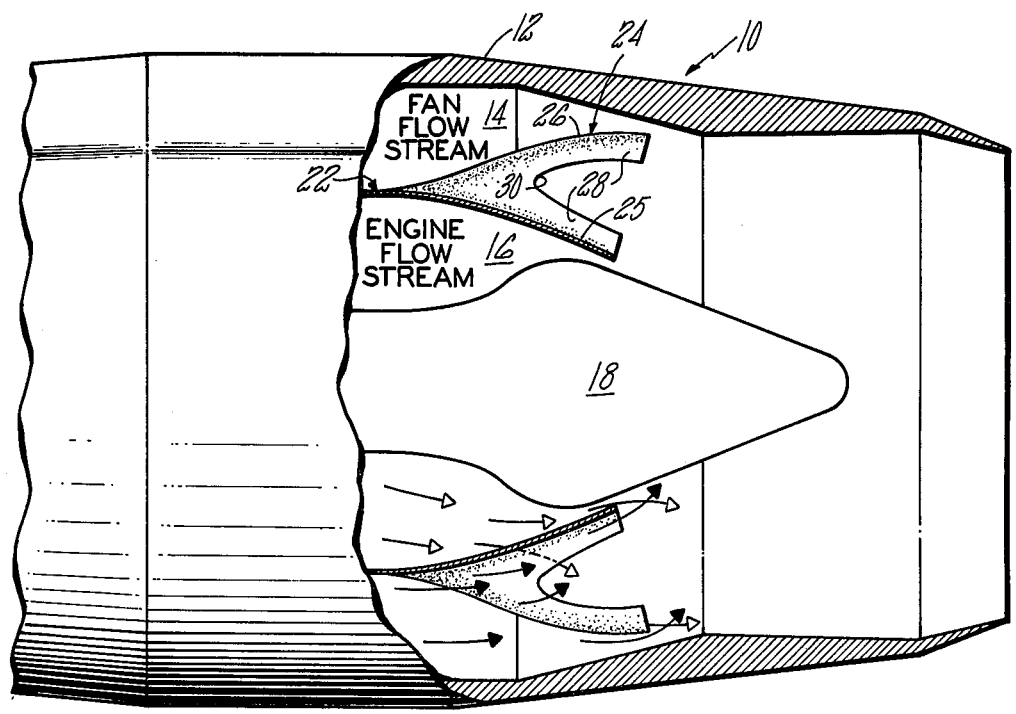
FIG. 1

LOBE MIXER FOR GAS TURBINE ENGINE

BACKGROUND OF THE INVENTION

This invention relates to turbine types of power plants and particularly to lobed mixers.

The mixing of two streams in a jet engine, particularly of the turbofan variety has been evolving over the past several years. For example, much work has been carried on to suppress sound of a turbofan engine by mixing the fan discharge flow with the core engine flow and lobe mixers have been heretofore utilized with much success. However, their design always included a compromise between mixing performance and pressure losses where a high degree of mixing is traded for pressure losses with consequential good sound suppression and poor engine performance and a low degree of mixing resulted in just the converse.

This invention contemplates improving lobed mixers by scalloping the side walls of the mixer, thereby increasing the mixing length and introducing trailing vortex sheets. This has proven to not only increase sound suppression but also improve propulsion performance or at least did not deteriorate it.

SUMMARY OF THE INVENTION

An object of this invention is to provide for a turbine type power plant an improved lobed mixer. Such mixer design includes having the side walls recessed to define a generally scalloped effect in the sinusoidal curvature of the mixer.

Other features and advantages will be apparent from the specification and claims and from the accompanying drawings which illustrate an embodiment of the invention.

BRIEF DESCRIPTION OF THE DRAWINGS

FIG. 1 is a partial view of a turbofan engine showing the improved lobe mixer.

FIG. 2 is a perspective view of the "scalloped" lobe mixer.

DESCRIPTION OF THE PREFERRED EMBODIMENT

The invention is shown in FIGS. 1 and 2 as being utilized in a fan-jet engine generally illustrated by reference numeral 10 which engine can be model JT-9D manufactured by the Pratt & Whitney Aircraft Division of United Technologies Corporation (the assignee) as being exemplary. As will be appreciated by one skilled in the art, this invention would have application for any application where two flow streams are mixed. The fan flow stream is in the outer annulus 14 adjacent the engine casing 12 and the core stream is in the inner annulus 16 adjacent the plug 18. The lobe mixer 20 separates the two annular streams at this juncture of the engine and serves to provide a means for efficiently mixing the two. As is well known the lobe mixer comprises an annular portion 22 on the upstream end and a lobed or sinusoidal wave forms 24 on the downstream end. As noted, the lobe is basically a plurality of convoluted valleys 25 on the outer surface and convoluted peaks 26 on the inner surface each defining open ended channels for alternately receiving the fan stream and the core stream. Heretofore, these streams would be guided to the downstream end of the mixer where mixing would ensue upon the stream discharging from its channel.

In accordance with this invention the side wall 28 adjacent each valley 25 and peak 26 are recessed a portion downstream of the annular portion 22, and the depth of the recess 30 is determined by the following design procedure. The design flow path contours of the convolute produce flow areas in the fan and core streams that give static pressure balance at the lobes trailing edge and at the leading edge of the scalloped region where the flows of the two streams meet, such that minimal flow adjustment occurs. The sides of the convolute are scalloped such that the overhang of peak 26 is of sufficient length and curvature to allow turning of the core stream gases from a near radial direction to axially aft, which then develops trailing vortex sheets for increased mixing of the gases.

It should be understood that the invention is not limited to the particular embodiments shown and described herein, but that various changes and modifications may be made without departing from the spirit or scope of this novel concept as defined by the following claims.

We claim:

1. A lobe mixer having wall means defining a generally annularly rearwardly shaped portion and a sinusoidally forwardly shaped portion, said latter portion defining peaks and valleys, concentric flow streams, one flowing on the inner portion and the other flowing on the outer portion of said mixer and said streams joining at the extremity of said sinusoidally shaped portion, each of the opposing wall means adjacent individual peaks and valleys recessed short of said annular shaped portion so that said flow streams comingle upstream of said extremity.

2. A lobe mixer as in claim 1 wherein the adjacent wall means are recessed so that the overhang of each peak is of sufficient length and curvature to allow turning of the inner concentric stream from a near radial direction to an axial one for defining trailing vortex sheets.

3. A lobe mixer as in claim 1 mounted in a turbofan type power plant where the flow inner of said mixer is the core engine flow and the flow outer of said mixer is fan flow.

4. In a turbine type power plant including an outer annular flow stream and an inner annular flow stream, a lobe mixer receiving both of said streams and directing the flow of each to provide mixing upon discharging therefrom, the improvement including side walls forming the adjacent valleys and peaks, each side wall having a recessed portion for comingling said streams upstream of said discharge end of said mixer.

5. In a turbine type power plant as claimed in claim 4 including a fan and a core engine each developing concentric flow streams and one of said streams flowing inner of said mixer and the other of said streams flowing outer of said mixer.

6. In a turbine type power plant as in claim 5 wherein said core stream flows inner of said mixer and the fan stream flows outer of said mixer.

* * * * *